(12) United States Patent
    Ollila

(10) Patent No.: US 12,608,762 B2
(45) Date of Patent: Apr. 21, 2026

(54) DEMOSAICKING AND SUPER-RESOLUTION USING WOBULATION

(71) Applicant: Varjo Technologies Oy, Helsinki (FI)

(72) Inventor: Mikko Ollila, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 260 days.

(21) Appl. No.: 18/357,633

(22) Filed: Jul. 24, 2023

(65) Prior Publication Data

US 2025/0037239 A1 Jan. 30, 2025

(51) Int. Cl.
    *G06T 3/4069* (2024.01)
    *G06T 3/4007* (2024.01)
    *G06T 3/4015* (2024.01)
    *G06T 5/50* (2006.01)
    *G06T 7/20* (2017.01)
    *G06T 7/70* (2017.01)
    *H04N 23/80* (2023.01)

(52) U.S. Cl.
    CPC .......... *G06T 3/4069* (2013.01); *G06T 3/4007* (2013.01); *G06T 3/4015* (2013.01); *G06T 5/50* (2013.01); *G06T 7/20* (2013.01); *G06T 7/70* (2017.01); *H04N 23/80* (2023.01); *G06T 2207/10016* (2013.01); *G06T 2207/10024* (2013.01); *G06T 2207/20081* (2013.01); *G06T 2207/20084* (2013.01); *G06T 2207/20212* (2013.01)

(58) Field of Classification Search
    None
    See application file for complete search history.

(56) References Cited

U.S. PATENT DOCUMENTS

| | | | | | |
|---|---|---|---|---|---|
| 2010/0214446 | A1* | 8/2010 | Watarai | ............... | H04N 23/843 |
| | | | | | 348/E9.037 |
| 2019/0327419 | A1* | 10/2019 | Onomura | ............. | H04N 23/951 |
| 2021/0397251 | A1* | 12/2021 | Eiden | ...................... | G06F 3/012 |
| 2023/0177649 | A1* | 6/2023 | Massal | ..................... | G06T 7/20 |

FOREIGN PATENT DOCUMENTS

JP          2023094234 A  *  7/2023

* cited by examiner

*Primary Examiner* — Quan Pham
(74) *Attorney, Agent, or Firm* — Ziegler IP Law Group, LLC.

(57) ABSTRACT

An imaging system includes an image sensor, a wobulator employed to perform sub-pixel shifts; and processor(s) configured to: obtain, in a cycle, two or three sub-images from the image sensor; control the wobulator to perform, during said cycle, one or two sub-pixel shifts, wherein step sizes of sub-pixel shifts vary within at least one of: same cycle, different cycles, wherein at least one of step sizes is X pixel, wherein X is a fraction lying between 0 and 1, at least one other of step sizes is Y pixels, wherein Y is an integer lying in a range from 1 to Z, Z being equal to a number of pixels of same colour lying along a direction of sub-pixel shift in a smallest repeating M×N array (204*a-b*) in the image sensor; and process the two or three sub-images to generate image(s).

18 Claims, 6 Drawing Sheets

302

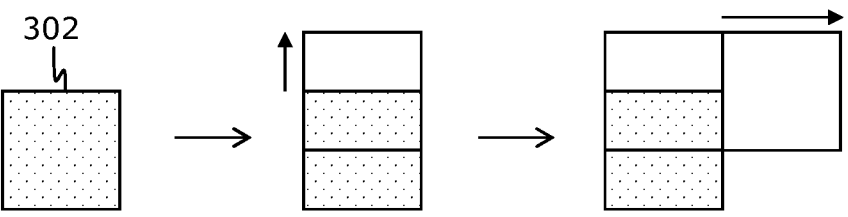
FIG. 3
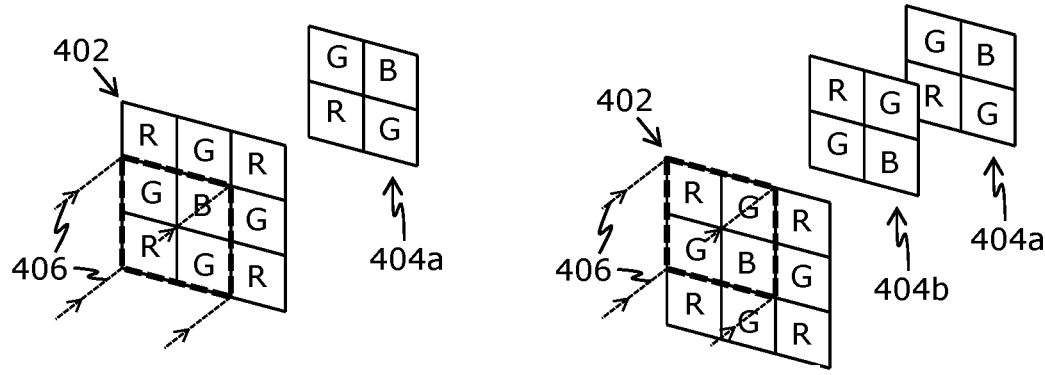
FIG. 4A
FIG. 4B
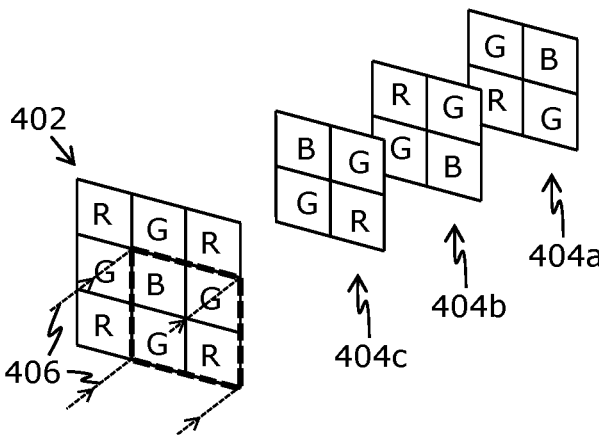
FIG. 4C

502

504a

502

504b

DEMOSAICKING AND SUPER-RESOLUTION USING WOBULATION

TECHNICAL FIELD

The present disclosure relates to imaging systems incorporating demosaicking and super-resolution using wobulation. Moreover, the present disclosure relates to methods incorporating demosaicking and super-resolution using wobulation.

BACKGROUND

Nowadays, with an increase in the number of images being captured every day, there is an increased demand for developments in image generation. Such a demand is quite high and critical in case of evolving technologies such as immersive extended-reality (XR) technologies which are being employed in various fields such as entertainment, real estate, training, medical imaging operations, simulators, navigation, and the like. Several advancements are being made to develop image generation technology.

Conventional devices employ various equipment and techniques to generate high-resolution images. Some devices employ wobulation-based pixel shifting technology, wherein a sequence of images is captured while performing sub-pixel shifting of an image sensor. Multiple images in the sequence are then processed to generate a single high-resolution image, for providing an apparent spatial super-resolution.

However, provision of high spatial resolutions for the images using wobulation-based pixel-shifting technology has certain problems associated therewith. Conventional devices employing the wobulation-based pixel-shifting technology require four or more images to be captured and processed to generate a single high-resolution image. This undesirably drastically reduces a frame rate of generating the images, for example, to one-fourth or even less. Moreover, capturing and processing image data of the four or more images is highly computationally-intensive and time-consuming, and also requires very high computing power. Therefore, existing equipment and techniques employing the wobulation-based pixel-shifting technology are unable to cope with visual quality requirements, for example, such as a high resolution (such as a resolution higher than or equal to 60 pixels per degree), a small pixel size, a large field of view, and a high frame rate (such as a frame rate higher than or equal to 90 FPS) in some devices (such as XR devices).

Therefore, in light of the foregoing discussion, there exists a need to overcome the aforementioned drawbacks.

SUMMARY

The aim of the present disclosure is to provide an imaging system and a method to generate highly accurate and realistic images, in computationally-efficient and time-efficient manner. The aim of the present disclosure is achieved by an imaging system and a method incorporating demosaicking and super-resolution using relatively lesser number of wobulation steps as compared to the prior art, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 3 illustrates how step sizes of sub-pixel shifts vary in a cycle of capturing sub-images, in accordance with an embodiment of the present disclosure;

FIGS. 4A, 4B, and 4C illustrate how sub-pixel shifting is performed when capturing three sub-images with an image sensor, in accordance with an embodiment of the present disclosure;

FIGS. 5A and 5B illustrate how sub-pixel shifting is performed when capturing two sub-images from an image sensor, while

DETAILED DESCRIPTION OF EMBODIMENTS

Figure 1:
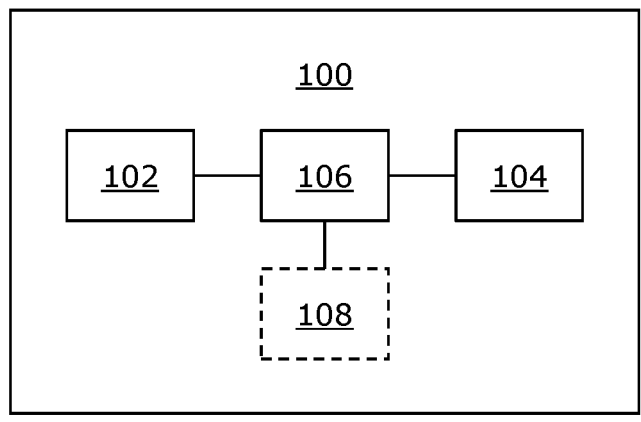
FIG. 1 illustrates a block diagram of an architecture of an imaging system incorporating demosaicking and super-resolution using wobulation, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides an imaging system comprising:

an image sensor;

a wobulator that is to be employed to perform sub-pixel shifts when capturing images with the image sensor; and at least one processor configured to:

obtain, in a cycle, two or three sub-images from the image sensor;

control the wobulator to perform, during said cycle, one or two sub-pixel shifts, wherein step sizes of sub-pixel shifts vary within at least one of: a same cycle, different cycles, wherein at least one of the step sizes is X pixel, wherein X is a fraction that lies between 0 and 1, at least one other of the step sizes is Y pixels, wherein Y is an integer that lies in a range from 1 to Z, Z being equal to a number of pixels of a same colour that lie along a direction of a given sub-pixel shift in a smallest repeating M×N array in the image sensor; and process the two or three sub-images of said cycle, to generate at least one image.

In a second aspect, the present disclosure provides a method comprising:

obtaining, in a cycle, two or three sub-images from an image sensor;

controlling a wobulator to perform one or two sub-pixel shifts when capturing the two or three sub-images during said cycle, wherein step sizes of sub-pixel shifts vary within at least one of: a same cycle, different cycles, wherein at least one of the step sizes is X pixel, wherein X is a fraction that lies between 0 and 1, at least one other of the step sizes is Y pixels, wherein Y is an integer that lies in a range from 1 to Z, Z being equal to a number of pixels of a same colour that lie along a direction of a given sub-pixel shift in a smallest repeating M×N array in the image sensor; and processing the two or three sub-images of said cycle, to generate at least one image.

The present disclosure provides the aforementioned imaging system and the aforementioned method incorporating demosaicking and super-resolution using wobulation to generate highly accurate and realistic images at an acceptably high frame rate as compared to prior art, in computationally-efficient and time-efficient manner. Herein, instead of capturing and processing four or more sub-images, only the two or three sub-images (corresponding to the one or two sub-pixel shifts) are captured and processed for generating the at least one image. Additionally, a fractional step size (i.e., when a step size is X pixel, wherein X is the fraction that lies between 0 and 1) facilitates in providing an apparent spatial super-resolution that is higher than a native resolution of the image sensor. Moreover, employing an integer step size facilitates in achieving an effect of demosaicking without having to perform an actual (i.e., full and regular) demosaicking on image data of the plurality of pixels of the image sensor, as only a minimal demosaicking may actually be required when processing the two or more sub-images.

The at least one image generated in this manner has acceptably high image quality (for example, in terms of a resolution, a high contrast, a high modulation transfer function (MTF) resolution, a low noise, and the like), and has minimal/no visible artifacts such as aliasing. The imaging system and the method are susceptible to cope with visual quality requirements, for example, such as a high resolution (such as a resolution higher than or equal to 60 pixels per degree), a small pixel size, and a large field of view, whilst achieving a high frame rate (such as a frame rate higher than or equal to 90 FPS). The imaging system and the method are simple, robust, fast, reliable, and can be implemented with ease.

It will be appreciated that the at least one image is generated in computationally-efficient and time-efficient manner, at an acceptably high (and controlled) frame rate, as compared to prior art. This is because instead of processing four or more sub-images for which three or more sub-pixel shifts are required to be performed in the prior art, only the two or three sub-images (for which only the one or two sub-pixel shifts are performed) are to be processed, for generating acceptably accurate and realistic image(s). The frame rate is expressed in terms of frames per second (FPS), and may, for example, be 60 FPS, 90 FPS, 120 FPS, or higher. For example, when the one sub-pixel shift or the two sub-pixel shifts are performed pursuant to embodiments of the present disclosure, instead of performing the three sub-pixel shifts (as required in the prior art), a frame rate drops to only ½ or ⅓, respectively, instead of ¼. Additionally, employing the one or two sub-pixel shifts would also facilitate in providing acceptably high image quality (for example, in terms of a high resolution, a high contrast, a high modulation transfer function (MTF) resolution, a low noise, and the like), and reducing visibility of artifacts such as aliasing.

Throughout the present disclosure, the term "image sensor" refers to a device that detects light from a real-world environment at its photosensitive surface, thereby enabling a plurality of pixels arranged on the photosensitive surface to capture a plurality of image signals. The plurality of image signals are electrical signals pertaining to a real-world scene of the real-world environment. The plurality of image signals constitute image data of the plurality of pixels. Herein, the term "image data" refers to information pertaining to a given pixel arranged on the photosensitive surface of the image sensor, wherein said information comprises one or more of: a colour value of the given pixel, a depth value of the given pixel, a transparency value of the given pixel, a luminance value of the given pixel. The colour value could, for example, be Red-Green-Blue (RGB) values, Red-Green-Blue-Alpha (RGB-A) values, Cyan-Magenta-Yellow-Black (CMYK) values, Red-Green-Blue-Depth (RGB-D) values, or similar. Image sensors are well-known in the art.

Examples of the image sensor include, but are not limited to, a charge-coupled device (CCD) image sensor, and a complementary metal-oxide-semiconductor (CMOS) image sensor. It will be appreciated that the plurality of pixels could, for example, be arranged in a rectangular two-dimensional (2D) grid, a polygonal arrangement, a circular arrangement, an elliptical arrangement, a freeform arrangement, or the like, on the photosensitive surface. In an example, the image sensor may comprise 25 megapixels arranged in the rectangular 2D grid (such as a 5000×5000 grid) on the photosensitive surface.

Optionally, the image sensor is a part of a camera that is employed to capture sub-images. Optionally, the camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Additionally, optionally, the camera is implemented as a depth camera. Examples of the depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. Optionally, the camera is implemented as a combination of the visible-light camera and the depth camera.

It will be appreciated that when capturing the two or three sub-images, it is ensured that either the camera (or the image sensor) is capturing images of a static real-world environment (i.e., only stationary objects or their parts are present in the real-world environment), or a change in a relative pose between the camera and a given object or its part present in the real-world environment is minimal/negligible. In this way, visual representation represented in the two or three sub-images would be significantly similar, and thus it would be advantageous to generate the at least one image by processing the two or three sub-images.

Optionally, the camera comprises a Bayer colour filter array (CFA) arranged in front of the plurality of pixels of the photosensitive surface of the image sensor. Such a Bayer CFA could be one of: a 4C Bayer CFA (also referred to as "quad" or "tetra", wherein a group of 2×2 pixels has a same colour), a 9C Bayer CFA (also referred to as "nona", wherein a group of 3×3 pixels has a same colour), a 16C Bayer CFA (also referred to as "hexadeca", wherein a group of 4×4 pixels has a same colour). As an example, the image sensor may have 576 million pixels, wherein 2×2 grids, 3×3 grids or even 4×4 grids of pixels of a same colour can be binned to form a single super pixel. The Bayer CFA is well-known in the art.

As another example, the RGB-IR camera can be a 2×2 pattern-based RGB-IR camera, a 4×4 pattern-based RGB-IR camera, or similar. Alternatively or additionally, optionally, the camera comprises a multispectral filter arranged in front of the plurality of pixels. Herein, the term "multispectral filter" refers to a type of filter that is capable of selectively transmitting or blocking certain wavelengths of the light incident upon the image sensor, thereby allowing only specific wavelengths of the light to pass therethrough. The multispectral filter is capable of filtering the light in a wider range of colours (for example, in 16 different colours or even more), as compared to traditional 3-5 colour filters used in any of the aforementioned visible-light cameras. The multispectral filters are well-known in the art.

Notably, the at least one processor controls an overall operation of the imaging system. The at least one processor is communicably coupled to at least the image sensor and the wobulator. Optionally, the at least one processor is implemented as an image signal processor. In an example, the image signal processor may be a programmable digital signal processor (DSP). Alternatively, optionally, the at least one processor is implemented as a cloud server (namely, a remote server) that provides a cloud computing service.

Throughout the present disclosure, the term "wobulator" refers to a device that is capable of performing sub-pixel shifts. The term "sub-pixel shift" refers to a pixel-level movement (namely, a pixel-level shifting) of the image sensor in a particular direction for capturing a sub-image with the image sensor. Different sub-images are captured corresponding to different sub-pixel shifts (as explained later). It will be appreciated that a given sub-pixel shift could be performed, for example, by physically moving the image sensor and/or its corresponding optics by a given step size in a particular direction, or by optically steering light (incoming towards the image sensor) by a given step size in a particular direction.

The image sensor and/or the optics could be physically moved (namely, tilted and/or shifted) by a given wobulator, for example, by way of using an actuator. The optical steering could, for example, be done by way of using a liquid crystal device, a mems-actuated soft polymer, a micromirror, a lens, a liquid lens, adaptive optics and the like. Wobulators are well-known in the art. Information pertaining to step sizes will be explained later.

In some implementations, when only one sub-pixel shift is performed by the wobulator during one cycle, two sub-images are obtained from the image sensor. In other words, the two (different) sub-images are captured by the image sensor using the one sub-pixel shift, wherein a first sub-image from amongst the two sub-images is captured when the image sensor is at its actual (namely, original) position (i.e., the first sub-image is captured when the image sensor or the light incoming towards the image sensor has not been shifted yet), and a second sub-image from amongst the two sub-images is captured when the image sensor or the light incoming towards the image sensor is shifted (i.e., moved) according to the one sub-pixel shift.

In other implementations, when two sub-pixel shifts are performed by the wobulator during one cycle, three sub-images are obtained. In other words, the three (different) sub-images are captured by the image sensor using the two sub-pixel shifts, wherein a first sub-image from amongst the three sub-images is captured when the image sensor is at its actual position, a second sub-image from amongst the three sub-images is captured when the image sensor or the light incoming towards the image sensor is shifted according to one of the two sub-pixel shifts, and a third sub-image from amongst the three sub-images is captured when the image sensor or the light incoming towards the image sensor is shifted according to another of the two sub-pixel shifts.

Notably, when performing the given sub-pixel shift, the image sensor is shifted by a given step size (of the given sub-pixel shift) along the particular direction. Said direction of the given sub-pixel shift is not necessarily a fixed direction for each cycle. In other words, it is not necessary that the image sensor would always be shifted in the fixed (i.e., same) direction, for example, such as always in a horizontal direction or a vertical direction.

In some implementations, when only the one sub-pixel shift is performed during one cycle, said direction could be changed alternately in consecutive cycles of capturing sub-images. For example, for a first cycle, said direction may be a horizontal direction; for a second cycle, said direction may be a vertical direction; for a third cycle, said direction may be a horizontal direction; and so on. In other implementations, when two sub-pixel shifts are performed during one cycle, said direction could be changed in an alternating manner in said one cycle. For example, in said one cycle, for one of the two sub-pixel shifts, said direction may be a horizontal direction, whereas for another of the two sub-pixel shifts, said direction may be a vertical direction. It will be appreciated that said direction could be any direction (for example, such as a diagonal direction) other than the horizontal direction and the vertical direction.

Throughout the present disclosure, the term "step size" refers to an amount or a distance by which the image sensor or the light incoming towards the image sensor is shifted/moved in a given direction, in order to perform a given sub-pixel shift. Lesser the step size of the given sub-pixel shift when capturing sub-images, greater may be the image quality (for example, in terms of a resolution) of the at least one image that is generated using said sub-images, and vice versa.

Notably, when at least one of the step sizes is X pixel, wherein X is a fraction that lies between 0 and 1, it means that at least one of the step sizes is a fractional step size, wherein when performing the given sub-pixel shift, the image sensor or the light incoming towards the image sensor is shifted along a given direction by an amount defined by a fraction of a size of a pixel. Typically, the size of the pixel lies in a range of 0.5 micrometres to 2 micrometres. The technical benefit of employing such a fractional step size is that it facilitates in providing an apparent spatial super-resolution that is higher than a native resolution of the image sensor. This is because when the given step size is the fraction of the size of the pixel, image data of pixels of the (captured) sub-images would be highly comprehensive, and thus image data of a corresponding pixel in the at least one image is highly accurately and realistically generated using the image data of the pixels of the (captured) sub-images. As a result, the at least one image would have an extremely high angular resolution. As an example, when a sub-pixel shift is performed in a particular direction with a fractional step size, the apparent resolution of the at least one image would become almost twice the standard resolution of the at least one image along that particular direction. As an example, when at least one of the step sizes is X pixel, X may be from 0.15, 0.25, 0.4 or 0.5 up to 0.5, 0.8, or 0.9. Optionally, the given step size is 0.5 pixel. It will be appreciated that irrespective of a type of Bayer CFA of the image sensor (that is, a regular Bayer CFA, a 4C Bayer CFA, a 9C Bayer CFA, or a 16C Bayer CFA), such a fractional step size is necessary for achieving the apparent spatial super-resolution.

Further, in addition to this, when at least one other of the step sizes is Y pixels, wherein Y is an integer that lies in the range from 1 to Z, it means that at least one other of the step sizes is an integer step size, wherein when performing the given sub-pixel shift, the image sensor or the light incoming towards the image sensor is shifted along a given direction by an amount defined by a size of one or more (full) pixels of the same colour that lie along the given direction in the smallest repeating M×N array. The technical benefit of employing such an integer step size is that it facilitates in achieving an effect of demosaicking without having to perform an actual (i.e., full and regular) demosaicking on the image data of the plurality of pixels of the image sensor. This is because, in one cycle, a sub-pixel shift having a step size of Y pixels would facilitate in capturing at least two sub-images in which a same pixel of the image sensor receives light from neighbouring 3D points in the real-world environment. This allows for capturing more detailed visual information of the real-world scene in the at least one image (that is generated from the at least two sub-images) as compared to when only one image is captured. Therefore, only a minimal demosaicking may actually be required when processing the two or more sub-images (as discussed later). In this way, upon said processing, the at least one image would be acceptably accurately and realistically generated.

Throughout the present disclosure, the term "smallest repeating M×N array" in a given image sensor refers to a smallest grid of pixels that is repeated in the given image sensor. The M×N array could, for example, be a 1×1 array, 2×2 array, a 2×3 array, a 3×3 array, a 4×4 array, or similar. In an example, for a standard Bayer CFA of the given image sensor, 1 pixel of the same colour lies along the given direction (for example, such as a horizontal direction). Thus, Z would be equal to 1; therefore, an integer step size of the given sub-pixel shift can be 1 pixel. In another example, for a quad Bayer CFA of the given image sensor, 2 pixels of the same colour lie along the given direction (for example, such as a vertical direction). Thus, Z would be equal to 2; therefore, the integer step size of the given sub-pixel shift could be either 1 pixel or 2 pixels. In yet another example, for a nona Bayer CFA of the given image sensor, 3 pixels of the same colour lie along the given direction (such as a horizontal direction). Thus, Z would be equal to 3; therefore, the integer step size of the given sub-pixel shift could be any of: 1 pixel, 2 pixels, 3 pixels. Similarly, for a hexadeca Bayer CFA of the given image sensor, Z would be equal to 4; therefore, the integer step size of the given sub-pixel shift may be any of: 1 pixel, 2 pixels, 3 pixels, 4 pixels. It will be appreciated that, in this case, when said step size is 1 pixel, 2 pixels or 3 pixels (instead of 4 pixels), partial demosaicking would be achieved.

Notably, different step sizes of the sub-pixel shifts could be employed within the same cycle and/or within the different cycles. It will be appreciated that the step sizes of the sub-pixel shifts vary within the different cycles irrespective of whether a given cycle has the one sub-pixel shift or the two sub-pixel shifts. The technical benefit of employing the different step sizes of the sub-pixel shifts is that it facilitates in both providing the apparent super-resolution in the at least one image and achieving the effect of demosaicking (without a need to perform full demosaicking) simultaneously. In an example, for a standard Bayer CFA of the given image sensor, when only the one sub-pixel shift is performed during one cycle, a step size of the one sub-pixel shift may be 0.5 pixel, 1 pixel, 0.5 pixel, and 1 pixel, in a first cycle, a second cycle, a third cycle, and a fourth cycle, respectively. In another example, for a standard Bayer CFA of the given image sensor, when the two sub-pixel shifts are performed during one cycle, step sizes of the one of the two sub-pixel shifts and the another of the two sub-pixel shifts may be 0.5 pixel and 1 pixel, respectively, in said one cycle. In yet another example, for a standard Bayer CFA of the given image sensor, when the two sub-pixel shifts are performed during one cycle, step sizes of both of the two sub-pixel shifts may be 0.5 pixel in a first cycle. Further, step sizes of both of the two sub-pixel shifts may be 1 pixel in a second cycle. In still another example, for a standard Bayer CFA of the given image sensor, when the two sub-pixel shifts are performed during one cycle, step sizes of a first sub-pixel shift amongst the two sub-pixel shifts and a second sub-pixel shift amongst the two sub-pixel shifts may be 0.5 pixel and 1 pixel, respectively, in a first cycle. Further, in a second cycle, the first sub-pixel shift and the second sub-pixel shift may be 1 pixel and 0.4 pixel, respectively.

Notably, the two or three sub-images of said cycle are processed to generate the at least one image. It will be appreciated that a given image is a visual representation of the real-world environment. The term "visual representation" encompasses colour information represented in the given image, and additionally optionally other attributes associated with the given image (for example, such as depth information, luminance information, transparency information (namely, alpha values), polarization information and the like). It will be appreciated that the at least one image may comprise a single image that is generated upon processing the two or three sub-images collectively, or may comprise two or three images that are generated upon processing the two or three sub-images individually, as described later.

Optionally, when processing the two or three sub-images, the at least one processor is configured to employ at least one image processing algorithm for performing demosaicking and super resolution. In this regard, the at least one image processing algorithm is a modified version of image processing algorithms that are well-known in the art for performing demosaicking and super resolution. If there were only one sub-image that were processed to generate the at least one image, standard demosaicking algorithms would be used. On the other hand, if there were four sub-images that were processed to generate the at least one image, no demosaicking would be required to be performed, because pixel data would be available for all the colours. Thus, employing the at least one image processing algorithm for processing the two or three sub-images provides a better result (namely, an improved image quality) as compared to the standard demosaicking performed on a single sub-image. The at least one image processing algorithm may also comprise at least one of: an image denoising algorithm, an image sharpening algorithm, a colour conversion algorithm, an auto white balancing algorithm, a deblurring algorithm, a contrast enhancement algorithm, a low-light enhancement algorithm, a tone mapping algorithm, a super-resolution algorithm, an image compression algorithm.

Optionally, when processing, the at least one processor is configured to perform demosaicking on the two or three sub-images to generate the at least one image. In this regard, the demosaicking is performed to generate a set of complete colour information (for example, such as RGGB colour information or similar) for each pixel position. This is because when the one or two sub-pixel shifts are performed (which are relatively lesser number of sub-pixel shifts as compared to the prior art), only partial (i.e., incomplete) colour information is obtained in the two or three sub-images for each pixel position. Although more detailed visual information is captured in the two or three sub-images as compared to a single image, a minimal amount of demosaicking is required to be performed on the two or three sub-images so that remaining colour information could also be obtained. It will be appreciated that the set of complete colour information is subsequently utilised for generating the at least one image. Moreover, the aforesaid demosaicking would be performed in a computationally-efficient and time-efficient manner, as it would not be the same as a full conventional demosaicking. The demosaicking is well-known in the art.

Optionally, the two or three sub-images comprise subsampled image data, wherein, when processing, the at least one processor is configured to perform interpolation and demosaicking on the subsampled image data, to generate the at least one image. In this regard, when the two or three sub-images comprises the subsampled image data, it means that the image sensor reads out only some pixels from the photo-sensitive surface, instead of reading out each and every pixel from the photo-sensitive surface. Thus, when selectively reading out the subsampled image data, image signals captured by only some pixels of the photo-sensitive surface are processed. It will be appreciated that such a selective read out of the subsampled image data facilitates in providing a higher frame rate of images. This is because a processing time for selectively reading out the subsampled image data and generating image data of remaining unread pixels of the photo-sensitive surface using image data of read pixels, is considerably lesser as compared to a processing time for reading out image data from each and every pixel of the photo-sensitive surface. Techniques for performing subsampling are well-known in the art.

Further, when generating the image data of the remaining unread pixels using the image data of the read pixels, the at least one processor is configured to perform the interpolation on the image data of the read pixels, to generate the image data of the remaining unread pixels. Herein, the "interpolation" is a specialized process of reconstructing unread image data of some pixels of the photo-sensitive surface by using image data read out from other pixels of the photo-sensitive surface. The interpolation is performed because the subsampled image data is obtained by the at least one processor. The interpolation is well-known in the art.

Optionally, when performing the interpolation, the at least one processor is configured to employ at least one interpolation filtering algorithm. Optionally, the at least one interpolation filtering algorithm is at least one of: a bilinear interpolation algorithm, an edge-directed weighted-sum interpolation algorithm, a weighted sum interpolation algorithm, a local colour ratio (LCR) algorithm, a median-based interpolation algorithm, an average-based interpolation algorithm, a linear interpolation filtering algorithm, a cubic interpolation filtering algorithm, a four-nearest-neighbours interpolation filtering algorithm, a natural-neighbour interpolation filtering algorithm, a steering kernel regression interpolation filtering algorithm. The aforesaid algorithms are well-known in the art.

Upon performing the interpolation, the demosaicking is performed to generate a set of complete colour information (for example, such as RGGB colour information or similar) for each pixel position. Such a set of complete colour information is subsequently utilised for generating the at least one image. In some implementations, the interpolation is performed prior to the demosaicking. In other implementations, the demosaicking and the interpolation are combined as a single operation, for example, when at least one neural network is to be employed (by the at least one processor) for performing the demosaicking and the interpolation (as discussed later). Some of the aforesaid interpolation filtering algorithms could also be used for performing the demosaicking. Optionally, the at least one processor is configured to employ a neural network for performing the interpolation and/or the demosaicking.

Optionally, the at least one processor is configured to process the two or three sub-images of said cycle to generate the at least one image, using at least one neural network, wherein an input of the at least one neural network comprises the two or three sub-images. Optionally, the input further comprises information indicative of: a direction in which the one or two sub-pixel shifts are performed, a step size of the one or two sub-pixel shifts. In this regard, an output of the at least one neural network comprises image data of pixels of the at least one image, upon processing the two or three sub-images. Since it is not necessary that the direction and the step sizes for the one or two sub-pixel shifts are fixed, the information indicative of: the direction and the step size is provided to the at least one neural network. However, when there would be a set/fixed pattern for using the one or two sub-pixel shifts in each cycle, the information indicative of: the direction and the step size need to be sent to the at least one processor only once, and not repeatedly. As an example, such information may be sent to the at least one processor as metainformation along with the two or three sub-images, or may be provided using a code with 8 or lesser number of bits. Thus, the at least one neural network can efficiently utilise even incomplete image data of pixels of the two or three sub-images to generate the at least one image that is acceptably accurate and realistic. For this, the at least one neural network may perform the interpolation and/or the demosaicking (as and when required) in a highly accurate manner, as compared to conventional techniques. It will be appreciated that the aforesaid input is provided to the at least one neural network both in a training phase of the at least one neural network and in an inference phase of the at least one neural network (i.e., when the at least one neural is utilised after it has been trained). It will also be appreciated that when the at least one neural network is used, the demosaicking and the interpolation could be combined as a single operation, unlike in the conventional techniques where the demosaicking and the interpolation are treated as separate operations and where information pertaining to linear or non-linear relationships between neighbouring pixels is necessary for performing these operations. The interpolation performed using the at least one neural network can be understood to be inpainting or hallucinating missing image data. In addition to these operations, there could be various image enhancement or image restoration operations (as mentioned hereinbelow) that can be performed additionally and optionally, using the at least one neural network. In this way, the at least one neural network may be trained to generate acceptably accurate missing image data based on available image data. These operations can even be performed at different scales or levels of detail to enhance an overall visual quality of the given image.

Additionally, optionally, a training process of the at least one neural network involves utilising a loss function that is generated based on perceptual factors and contextual factors. Such a loss function would be different from a loss function utilised in the conventional techniques. Perceptual loss factors may relate to visual perception of the generated given image. Instead of solely considering pixel-level differences, perceptual loss factors aim to measure a similarity in terms of higher-level visual features of an image. Contextual loss factors may take into account a relationship and a coherence between neighbouring pixels in the image. By incorporating the perceptual factors and the contextual factors into the training process, the at least one neural network can produce a visually-pleasing and contextually-coherent result. It will be appreciated that the loss function of the at least one neural network could optionally also take into account various image enhancement/restoration operations beyond just the demosaicking and the interpolation; the various image enhancement/restoration operations may, for example, include at least one of: deblurring, contrast enhancement, low-light enhancement, tone mapping, colour conversion, super-resolution, white balancing, super-resolution, compression.

When evaluating a performance of the at least one neural network and its associated loss function, it can be beneficial to compare the generated image and a ground-truth image at different scales/resolutions. This can be done to assess an image quality and a visual fidelity of the generated image across various levels of detail/resolutions. For instance, the aforesaid comparison can be made at a highest resolution, which represents an original resolution of the image. This allows for a detailed evaluation of pixel-level accuracy of the generated image. Alternatively or additionally, the aforesaid comparison can be made at a reduced resolutions, for example, such as ¼th of the original resolution. This provides an assessment of an overall perceptual quality and ability of the at least one network to capture and reproduce important visual features at coarser levels of detail also. Thus, by evaluating the loss function at different scales, more comprehensive understanding of the performance of the at least one neural network can be known. The loss function, the perceptual factors, and the contextual factors are well-known in the art.

Moreover, optionally, the input of the at least one neural network further comprises information indicative of a resolution (for example, such as in terms of pixels per degree) of the two or three sub-images. However, when it is already known to the at least one neural network that the image sensor reads out image data at a particular resolution, the information indicative of the aforesaid resolution may not be required to be provided as the input each time.

Additionally, optionally, pixels per degree (PPD) of a given sub-image could vary spatially, depending on a distortion profile of the camera. In such a case, pixel density would also vary across a field of view of the camera. As the PPD could be a function of a pixel location, the PPD could also be indicated by way of pixel locations. It will be appreciated that the PPD of the given sub-image would facilitate the at least one neural network to conveniently and accurately process the given sub-image, for producing the at least one image. Resultantly, visual information represented in the at least one image (for example, colours, depths, brightness, and the like, of pixels in the full image frame) would be highly accurate and realistic. Furthermore, information pertaining to the PPD could be stacked/embedded with colour filter information. For example, when an RGGB Bayer CFA is employed, the information pertaining to the PPD may be stacked with each of four colour planes of RGGB Bayer CFA information. By stacking said information with the colour filter information, resulting output would have same spatial dimensions as colour planes of the colour filter array employed.

Optionally, the at least one neural network is any one of: a U-net type neural network, an autoencoder, a pure Convolutional Neural Network (CNN), a Residual Neural Network (ResNet), a Vision Transformer (ViT), a neural network having self-attention layers, a generative adversarial network (GAN). It will be appreciated that a cascade of neural networks could also be employed for processing the two or three sub-images of said cycle to generate the at least one image. As an example, two neural networks in said cascade may be employed, wherein a first neural network is a U-net type neural network that is employed for performing the interpolation on the two or three sub-images, and a second neural network is another U-net type neural network that is employed for performing the demosaicking, when the two or three sub-images comprise the subsampled image data.

It will be appreciated that conventional Bayer CFA pattern-based image sensors typically allow for skipping entire rows and/or entire columns of a Bayer CFA pattern, i.e., some pixels may not have colour information captured in those rows and/or columns, because the resulting subsampled data is still in accordance with the Bayer CFA pattern. As an example, entire rows and/or entire columns may be skipped in an alternating manner conventionally. However, such conventional image sensors do not typically support skipping rows and/or columns only partially. Pursuant to embodiments of the present disclosure, the at least one neural network could still handle such an uneven subsampling from the Bayer CFA pattern where rows and/or columns are skipped partially. This implies that the at least one neural network could potentially work with a subset of pixels from a given row and/or a given column of the Bayer CFA pattern.

It will also be appreciated that in order to preserve structural details of neighbouring pixels (for example, such as information pertaining to edges, blobs, high-frequency features, and the like) in the at least one image, and to avoid generation of undesirable artifacts in the at least one image, a gradient loss function (L) could be beneficially employed in a pixel-by-pixel manner. The gradient loss function (L) could, for example, be represented as follows:

$$L = \|\nabla Y - \nabla Y'\| + \|\nabla' Y - \nabla' Y'\|$$

wherein $\nabla$ and $\nabla'$ represent a horizontal gradient operation and a vertical gradient operation, respectively. The gradient loss function (L) measures a discrepancy between gradients of two versions of the at least one image in both a horizontal direction and a vertical direction. Various gradient loss functions may be employed apart from that mentioned above. As an example, a gradient loss function may comprise masks that selectively exclude or include certain pixels, for example, such as only interpolated pixels would be considered in a calculation of the gradient loss function.

By using masks to control inclusion or exclusion of the certain pixels, the gradient loss function can be employed to focus on specific regions or features of interest in the at least one image. This flexibility allows for more fine-grained control over preservation of the structural details in the at least one image. Additionally, a directional weighted interpolation technique may be used for performing an interpolation on image data of the at least one image.

Furthermore, optionally, the at least one image comprises two or three images corresponding to the two or three sub-images, wherein the at least one processor is configured to:

obtain information indicative of a gaze direction of a user's eye;

identify a gaze position within a photosensitive surface of the image sensor, based on the gaze direction of the user's eye;

select a gaze region of the photosensitive surface based on the gaze position, wherein the gaze region of the photosensitive surface includes and surrounds the gaze position, while a peripheral region of the photosensitive surface surrounds the gaze region;

process parts of the two or three sub-images that have been read out from the gaze region of the photosensitive surface, to generate a single gaze image segment corresponding to the gaze region;

process respective parts of the two or three sub-images that have been read out from the peripheral region of the photosensitive surface, to generate respective ones of two or three peripheral image segments corresponding to the peripheral region; and combine each of the two or three peripheral image segments with the single gaze image segment, to generate a respective one of the two or three images.

Optionally, the at least one processor is configured to obtain, from a client device, the information indicative of the gaze direction of the user's eye. Optionally, in this regard, the client device comprises gaze-tracking means. The client device could be implemented, for example, as a head-mounted display (HMD) device. The term "gaze direction" refers to a direction in which the user's eye is gazing. The gaze direction may be represented by a gaze vector. Furthermore, the term "gaze-tracking means" refers to specialized equipment for detecting and/or following the user's gaze. The gaze-tracking means could be implemented as contact lenses with sensors, cameras monitoring a position, a size and/or a shape of a pupil of the user's eye, and the like. Such gaze-tracking means are well-known in the art. The term "head-mounted display" device refers to a specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses augmented reality (AR), mixed reality (MR), and the like.

Optionally, the gaze direction is a current gaze direction. Alternatively, optionally, the gaze direction is a predicted gaze direction. It will be appreciated that optionally the predicted gaze direction is predicted, based on a change in the user's gaze, wherein the predicted gaze direction lies along a direction of the change in the user's gaze. In such a case, the change in the user's gaze could be determined in terms of a gaze velocity and/or a gaze acceleration of the user's eye (as discussed later), using information indicative of previous gaze directions of the user's eye and/or the current gaze direction of the user's eye. Yet alternatively, optionally, the gaze direction is a default gaze direction, wherein the default gaze direction is straight towards a centre of a field of view of the image sensor. In this regard, it is considered that the gaze of the user's eye is, by default, typically directed towards a centre of his/her field of view. In such a case, a central region of a field of view of the user is resolved to a much greater degree of visual detail, as compared to a remaining peripheral region of the field of view of the user. It is to be understood that a gaze position corresponding to the default gaze direction lies at a centre of the photosensitive surface.

Optionally, when identifying the gaze position within the photosensitive surface, the at least one processor is configured to map the gaze direction of the user's eye onto the photosensitive surface. The term "gaze position" refers to a position on the photosensitive surface onto which the gaze direction is mapped. The gaze position may, for example, be at a centre of the photosensitive surface, at a point in a top-left region of the photosensitive surface, at a point in a bottom-right region of the photosensitive surface, or similar.

It will be appreciated that the gaze region and the peripheral region of the photosensitive surface are optionally selected dynamically, based on the gaze position. Such a dynamic manner of selecting the gaze region and the peripheral region emulates a way in which the user actively focuses within his/her field of view. It is to be understood that some pixels from amongst the plurality of pixels of the photosensitive surface lie in the gaze region, while remaining pixels from amongst the plurality of pixels lie in the peripheral region.

The term "gaze region" of the photosensitive surface refers to a region of the photosensitive surface that corresponds to the gaze direction, i.e., whereat the gaze is directed (namely, focused). In other words, the gaze region is a region-of-focus of the gaze (namely, a region-of-interest) within the photosensitive surface. The term "peripheral region" of the photosensitive surface refers to a remaining region of the photosensitive surface that remains after excluding the gaze region. It is to be understood that objects whose image signals are captured by the gaze region are gaze-contingent objects, and such objects are focused onto foveae of user's eyes, and are resolved to a much greater detail as compared to remaining object(s) whose image signals are captured by the peripheral region.

It will be appreciated that the gaze region may have a well-shaped boundary that resembles any of a circle, a polygon, an ellipse, and the like. Alternatively, the gaze region may have a freeform-shaped boundary i.e., a boundary that does not resemble any specific shape. Optionally, an angular extent of the gaze region lies in a range of 0 degrees from the gaze position to 2-50 degrees from the gaze position, while an angular extent of the peripheral region lies in a range of 12.5-50 degrees from the gaze position to 45-110 degrees from the gaze position. Optionally, the gaze region covers a first predefined percentage of the plurality of pixels of the image sensor, wherein the first predefined percentage lies in a range of 10 percent to 60 percent. Optionally, the peripheral region covers a second predefined percentage of the plurality of pixels of the image sensor, wherein the second predefined percentage lies in a range of 40 percent to 90 percent. In an example where the image sensor comprises 25 megapixels arranged in the rectangular 2D grid (such as a 5000×5000 grid) on the photosensitive surface, when the gaze position is at a centre of the photosensitive surface, 5 megapixel (namely, 5 million pixels) arranged as a 1000×1000 grid may lie in the gaze region (namely, a central region) of the photosensitive surface, while remaining 20 megapixels may lie in the peripheral region of the photosensitive surface.

Further, image data of the parts of the two or three sub-images that correspond to the gaze region of the photosensitive surface could be processed together to generate the single gaze image segment. In this regard, the at least one processor may perform the demosaicking on the parts of the two or three sub-images together, namely in one go, to generate the single gaze image segment. On the other hand, image data of the respective parts of the two or three sub-images that correspond to the peripheral region of the photosensitive surface could be processed separately (i.e., individually) to generate the respective ones of two or three peripheral image segments (i.e., two or three separate peripheral image segments). In this regard, the at least one processor may perform the demosaicking on the respective parts of the two or three sub-images separately.

Optionally, when combining each of the two or three peripheral image segments with the single gaze image segment, the at least one processor is configured to employ at least one image processing algorithm. Optionally, in this regard, the at least one image processing algorithm is at least one of: an image stitching algorithm, an image merging algorithm, an image combining algorithm, an image blending algorithm.

Optionally, upon combining, a given image from the amongst the two or three images comprises the single gaze image segment and a given peripheral image segment from amongst the two or three peripheral image segments, wherein the given peripheral image segment surrounds the single gaze image segment, and a spatial resolution of the single gaze image segment is higher than a spatial resolution of the given peripheral image segment. The technical benefit of generating the single gaze image segment and the two or three peripheral image segments, and utilising them to generate the two or three peripheral image segments in the aforesaid manner is that when a sequence of the two or three images (upon generation) is presented to the user, the user would not perceive any flicker or jerk in the peripheral image segments, due to a higher temporal resolution in the peripheral image segments, whilst experiencing a higher spatial resolution in the single gaze image segment. In this way, a viewing experience of the user would become more immersive and realistic.

Moreover, Optionally, the at Least One Processor is Configured to:

obtain information indicative of a gaze direction of a user's eye;

determine, based on the gaze direction of the user's eye obtained within a given time period, at least one of: a gaze velocity, a gaze acceleration, a predicted gaze direction, of the user's eye;

detect, based on the at least one of: the gaze velocity, the gaze acceleration, the predicted gaze prediction, whether the user's gaze has been fixated and optionally a gaze region of a photosensitive surface of the image sensor where the user's gaze has been fixated; and perform operations of obtaining the two or three sub-images in the cycle, controlling the wobulator to perform the one or two sub-pixel shifts during the cycle, and processing the two or three sub-images to generate the at least one image, only when it is detected that the user's gaze has been fixated, wherein optionally, the step of processing the two or three sub-images is performed for the gaze region only.

In this regard, the term "gaze velocity" refers to an angular velocity with which the user's gaze is changing, whereas the term "gaze acceleration" refers to an angular acceleration with which the user's gaze is changing. Information pertaining to the gaze direction and how it is obtained by the at least one processor has already been discussed earlier in detail.

Optionally, when determining the gaze velocity, the at least one processor is configured to determine a rate of change of the gaze direction of the user's eye (namely, a rate of change of gaze positions) within the given time period. In this regard, the at least one processor is configured to determine a distance between two consecutive gaze positions (for example, such as an initial gaze position at a first time instant and a final gaze position at a second time instant), and then divide said distance by a difference between the time instants of determining the two consecutive gaze positions, in order to obtain the gaze velocity in a particular direction. Optionally, when determining the gaze acceleration, the at least one processor is configured to determine a rate of change of the gaze velocity within the given time period. In this regard, the at least one processor is configured to determine a difference between two consecutive gaze velocities (for example, such as an initial gaze velocity at a first time instant and a final gaze velocity at a second time instant), and then divide said difference by a difference between the time instants of determining the two consecutive gaze velocities, in order to obtain the gaze acceleration in a particular direction. The gaze velocity and the gaze acceleration are used to determine how fast the user's gaze is changing. Optionally, the given time period lies in a range of 200 milliseconds to 2000 milliseconds. It will be appreciated that since the gaze direction of the user's eye may keep on changing continuously within the given time period, the at least one processor would also determine the gaze velocity and/or the gaze acceleration continuously. Determination of the gaze velocity and/or the gaze acceleration using the user's gaze is well-known in the art.

Typically, when the user's gaze is fixated, it is highly likely that the user is focusing on a region of interest within the real-world environment. The region of interest could have visual representation that is more noticeable and prominent as compared to visual representation in remaining region(s) of the real-world environment.

Optionally, when detecting whether the user's gaze has been fixated, the at least one processor is configured to analyse how the gaze velocity and/or the gaze acceleration changes during a given time period. Optionally, in this regard, a saccade of a user's eye is considered is to start at gaze velocities that are higher than a first predefined threshold and to end at gaze velocities that are lower than a second predefined threshold. It will be appreciated that it may be detected that the user's gaze has been fixated, and he/she is very likely concentrating on a region of interest within the real-world environment towards an end of a given saccade. Optionally, the first predefined threshold lies in a range of 50 to 90 degrees of angular width per second, said angular width being measured with respect to a pose of the image sensor. Optionally, the second predefined threshold lies in a range of 50 to 70 degrees of angular width per second. As an example, the first predefined threshold can be 80 degrees per second, while the second predefined threshold can be 60 degrees per second. In such a case, a given saccade is considered to start when the gaze velocity exceeds 80 degrees per second, and to end when the gaze velocity is lower than 60 degrees per second.

Thus, it will be appreciated that the aforesaid operations only need to be performed when the user's gaze has been fixated, i.e., wobulation would only be performed when the user's gaze is fixated, as in such a case, it is beneficial to generate high-resolution and realistic image(s) to be presented to the user. This is because when the user's gaze is fixated, the user is likely to see the at least one image and perceive the visual content represented in the at least one image (generated from the two or three sub-images). Therefore, it is beneficial to generate the at least one image from the two or three sub-images, to present a high quality image to the user. On the other hand, when it is detected the user's gaze has not been fixated, i.e., when the user's gaze is changing very rapidly/frequently, the aforesaid operations need not be performed by the at least one processor. This is because when the user's gaze is not fixated, the user is likely to undergo saccadic suppression. It is well known that the user's eyes are at least partially blind prior to the shifting of the user's eyes from a previous gaze region to a next gaze region. Thus, in such a case, the wobulation need not be performed, and generating low-resolution image(s) would be sufficient to be presented to the user. In this regard, the at least one processor is optionally configured to: obtain individual input images from the image sensor (the input image being captured by the image sensor in a conventional way); and process the input images by performing interpolation and/or demosaicking on the input images individually. Such an input image may comprise sampled image data and/or subsampled image data. Not performing the aforesaid operations may also result in saving some processing resources and processing time of the at least one processor.

Optionally, the imaging system further comprises pose-tracking means, wherein the at least one processor is configured to:

process pose-tracking data, obtained from the pose-tracking means, to determine a pose of the image sensor;

determine a rate at which the pose of the image sensor changes; and perform operations of obtaining the two or three sub-images in the cycle, controlling the wobulator to perform the one or two sub-pixel shifts during the cycle, and processing the two or three sub-images to generate the at least one image, only when the rate at which the pose of the image sensor changes does not exceed a predefined threshold.

The term "pose-tracking means" refers to specialized equipment that is employed to detect and/or follow a pose of the image sensor. The term "pose" encompasses position and/or orientation. Optionally, the pose-tracking means is employed to track a pose of the HMD device that is worn by the user on his/her head, when the image sensor (being the part of the camera) is mounted on the HMD device. Thus, in such a case, the pose of the image sensor changes according to a change in the pose of the HMD device. Pursuant to embodiments of the present disclosure, the pose-tracking means is implemented as a true six Degrees of Freedom (6DoF) tracking system. In other words, the pose-tracking means tracks both position and orientation of the image sensor within a 3D space of the real-world environment. In particular, said pose-tracking means is configured to track translational movements (namely, surge, heave and sway movements) and rotational movements (namely, roll, pitch and yaw movements) of the image sensor within the 3D space. The pose-tracking means could be implemented as at least one of: an optics-based tracking system (which utilizes, for example, infrared beacons and detectors, infrared cameras, visible-light cameras, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). The aforesaid pose-tracking means are well-known in the art.

Optionally, the at least one processor is configured to employ at least one data processing algorithm to process the pose-tracking data, to determine the pose of the image sensor. The pose-tracking data may be in the form of images, IMU/TIMU values, motion sensor data values, magnetic field strength values, or similar. Examples of the at least one data processing algorithm include, but are not limited to, a feature detection algorithm, an environment mapping algorithm, and a data extrapolation algorithm.

It will be appreciated that the pose-tracking means continuously tracks the pose of the image sensor throughout a given session of using the imaging system (and the HMD device). In such a case, the at least one processor continuously determines the pose of the image sensor (in real time or near-real time), and thus the at least one processor could easily and accurately determine the rate of change of the pose of the image sensor i.e., how frequently the pose of the image sensor is changing per unit time.

The predefined threshold defines a maximum (i.e., allowable) rate of change of the pose of the image sensor, below which it could be considered that the change of the pose of the image sensor is insignificant (i.e., very low), and thus the aforesaid operations would be beneficial to be performed by the at least one processor. This is because when said rate is below the predefined threshold, the pose of the HMD device (namely, a head pose of the user wearing the HMD device) is not changing rapidly, and thus the visual content represented in the two or three sub-images would be significantly similar, and it would be advantageous to generate the at least one image by processing the two or three sub-images. Therefore, the wobulation would be beneficial to be performed for generating high-resolution and realistic image(s). Alternatively, when the rate of change of the pose of the image sensor exceeds the predefined threshold, it could be considered that the pose of the image sensor (and thus the pose of the HMD device or the head pose of the user) is changing very rapidly, and thus the aforesaid operations need not performed by the at least one processor. In other words, the wobulation would not be required to be performed, and generating low-resolution image(s) would be sufficient to be presented to the user. In this regard, the at least one processor is optionally configured to generate the at least one image using the individual input images obtained from the image sensor, as discussed earlier. Not performing the aforesaid operations may also result in saving some processing resources and processing time of the at least one processor. Optionally, the predefined threshold lies in a range of 0.1 degree per millisecond to 20 degrees per millisecond.

Optionally, the at Least One Processor is Configured to:

analyse a sequence of images captured using the image sensor, to detect a movement of objects represented in said sequence of images; and perform operations of obtaining the two or three sub-images in the cycle, controlling the wobulator to perform the one or two sub-pixel shifts during the cycle, and processing the two or three sub-images to generate the at least one image, only when a rate at which the objects move does not exceed a predefined threshold.

Optionally, in this regard, when analysing the sequence of images captured using the image sensor, the at least one processor is configured to extract a plurality of features from each image in the sequence; and determine positional coordinates of a given feature in each image for detecting/tracking the movement of the objects or their parts. It will be appreciated that by extracting the plurality of features, the at least one processor could easily identify at least a part of a given object. Examples of the plurality of features include, but are not limited to, edges, corners, blobs, ridges, high-frequency features, low-frequency features. Optionally, the at least one processor is configured to employ at least one data processing algorithm for extracting the plurality of features from the given image. Examples of the at least one data processing algorithm include, but are not limited to, an edge-detection algorithm (for example, such as Canny edge detector, Deriche edge detector and the like), a corner-detection algorithm (for example, such as Harris & Stephens corner detector, Shi-Tomasi corner detector, Features from Accelerated Segment Test (FAST) corner detector and the like), a blob-detection algorithm (for example, such as Laplacian of Gaussian (LoG)-based blob detector, Difference of Gaussians (DoG)-based blob detector, Maximally Stable Extremal Regions (MSER) blob detector, and the like), a feature descriptor algorithm (for example, such as Binary Robust Independent Elementary Features (BRIEF), Gradient Location and Orientation Histogram (GLOH), Histogram of Oriented Gradients (HOG), and the like), a feature detector algorithm (for example, such as the SIFT, the SURF, Oriented FAST and rotated BRIEF (ORB), and the like). It will be appreciated that the at least one processor need not identify objects or their parts represented in the given image, but only needs to identify features that belong to the objects or their parts. Detecting/tracking the movement of the objects represented in the sequence of images is well-known in the art.

Further, the predefined threshold defines a maximum (i.e., allowable) rate at which the objects move in said sequence of images, below which it could be considered that a change in the movement of the objects in said sequence is insignificant (i.e., very low), and thus the aforesaid operations would be performed by the at least one processor. This is because when said rate is below the predefined threshold, positions of the objects is said sequence of images are not considerably changing, and thus the visual content represented in the two or three sub-images would be significantly similar, and it would be advantageous to generate the at least one image by processing the two or three sub-images. Therefore, the wobulation would be beneficially performed for generating high-resolution and realistic image(s). Alternatively, when the rate at which the objects move in said sequence exceeds the predefined threshold, it could be considered that positions of the objects in said sequence of images are changing drastically (for example, such as when a given object is a moving object), and thus the aforesaid operations need not be performed by the at least one processor. In other words, the wobulation would not be performed, and generating low-resolution image(s) would be sufficient to be presented to the user. In this regard, the at least one processor is optionally configured to generate the at least one image using the individual input images from the image sensor, as discussed earlier. Not performing the aforesaid operations may also result in saving some processing resources and processing time of the at least one processor. Optionally, the predefined threshold lies in a range of 0.5 pixel per millisecond to 100 pixels per millisecond.

The present disclosure also relates to the method as described above. Various embodiments and variants disclosed above, with respect to the aforementioned imaging system, apply mutatis mutandis to the method.

Optionally, in the method, the step of processing comprises performing demosaicking on the two or three sub-images for generating the at least one image.

Optionally, in the method, the two or three sub-images comprise subsampled image data, wherein the step of processing comprises performing interpolation and demosaicking on the subsampled image data, for generating the at least one image.

Optionally, in the method, the step of processing the two or three sub-images of said cycle to generate the at least one image is performed using at least one neural network, wherein an input of the at least one neural network comprises the two or three sub-images. The input optionally further comprises information indicative of: a direction in which the one or two sub-pixel shifts are performed, a step size of the one or two sub-pixel shifts.

Optionally, the at least one image comprises two or three images corresponding to the two or three sub-images, wherein the method further comprises:

obtaining information indicative of a gaze direction of a user's eye;

identifying a gaze position within a photosensitive surface of the image sensor, based on the gaze direction of the user's eye;

selecting a gaze region of the photosensitive surface based on the gaze position, wherein the gaze region of the photosensitive surface includes and surrounds the gaze position, while a peripheral region of the photosensitive surface surrounds the gaze region;

processing parts of the two or three sub-images that have been read out from the gaze region of the photosensitive surface, for generating a single gaze image segment corresponding to the gaze region;

processing respective parts of the two or three sub-images that have been read out from the peripheral region of the photosensitive surface, for generating respective ones of two or three peripheral image segments corresponding to the peripheral region; and combining each of the two or three peripheral image segments with the single gaze image segment, for generating a respective one of the two or three images.

Optionally, the Method Further Comprises:

obtaining information indicative of a gaze direction of a user's eye;

determining, based on the gaze direction of the user's eye obtained within a given time period, at least one of: a gaze velocity, a gaze acceleration, a predicted gaze direction, of the user's eye;

detecting, based on the at least one of: the gaze velocity, the gaze acceleration, the predicted gaze direction, whether the user's gaze has been fixated and optionally a gaze region of a photosensitive surface of the image sensor where the user's gaze has been fixated; and performing operations of obtaining the two or three sub-images in the cycle, controlling the wobulator to perform the one or two sub-pixel shifts during the cycle, and processing the two or three sub-images to generate the at least one image, only when it is detected that the user's gaze has been fixated, wherein optionally, the step of processing the two or three sub-images is performed for the gaze region only.

Optionally, the Method Further Comprises:

processing pose-tracking data, obtained from pose-tracking means, to determine a pose of the image sensor;

determining a rate at which the pose of the image sensor changes; and performing operations of obtaining the two or three sub-images in the cycle, controlling the wobulator to perform the one or two sub-pixel shifts during the cycle, and processing the two or three sub-images to generate the at least one image, only when the rate at which the pose of the image sensor changes does not exceed a predefined threshold.

Optionally, the Method Further Comprises:

analysing a sequence of images captured using the image sensor, to detect a movement of objects represented in said sequence of images; and performing operations of obtaining the two or three sub-images in the cycle, controlling the wobulator to perform the one or two sub-pixel shifts during the cycle, and processing the two or three sub-images to generate the at least one image, only when a rate at which the objects move does not exceed a predefined threshold.

DETAILED DESCRIPTION OF THE DRAWINGS

Referring to FIG. 1, illustrated is a block diagram of an architecture of an imaging system 100 incorporating demosaicking and super-resolution using wobulation, in accordance with an embodiment of the present disclosure. The imaging system 100 comprises an image sensor 102, a wobulator 104, and at least one processor (depicted as a processor 106). Optionally, the imaging system 100 further comprises pose-tracking means 108. The processor 106 is communicably coupled to the image sensor 102, the wobulator 104, and the pose-tracking means 108. The processor 106 is configured to perform various operations, as described earlier with respect to the aforementioned first aspect.

It may be understood by a person skilled in the art that FIG. 1 includes a simplified architecture of the imaging system 100, for sake of clarity, which should not unduly limit the scope of the claims herein. It is to be understood that the specific implementation of the imaging system 100 is provided as an example and is not to be construed as limiting it to specific numbers or types of image sensors, wobulators, pose-tracking means, and processors. The person skilled in the art will recognize many variations, alternatives, and modifications of embodiments of the present disclosure.

Figure 2A:
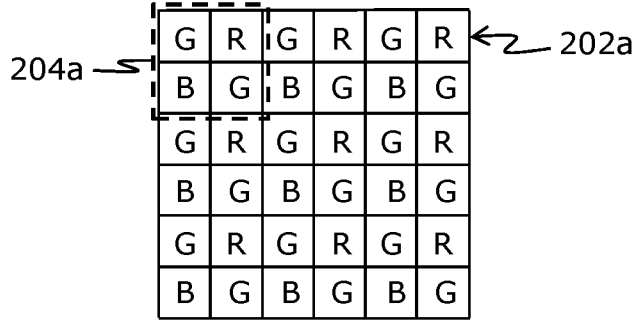
FIGS. 2A and 2B illustrate different examples of colour filter arrays of image sensors having different smallest repeating M×N arrays, in accordance with an embodiment of the present disclosure.
Figure 2B:
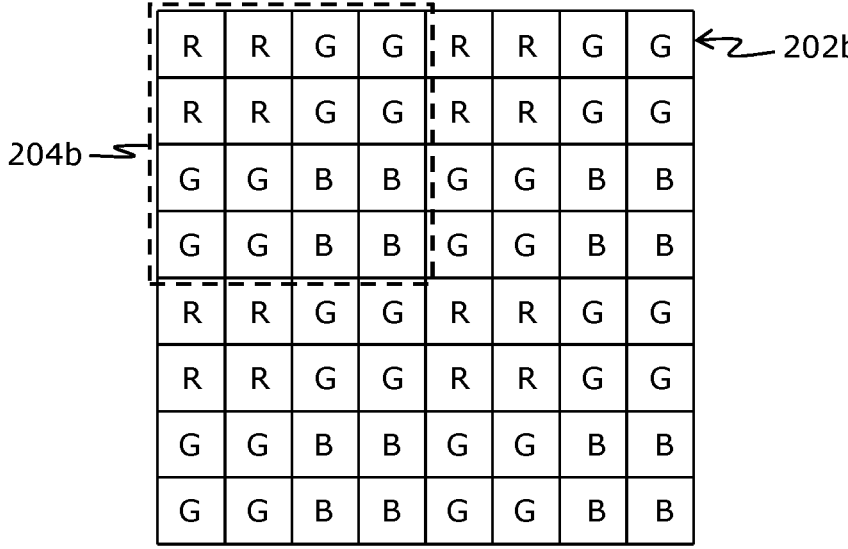

Referring to FIGS. 2A and 2B, illustrated are different examples of colour filter arrays 202a and 202b having different smallest repeating M×N arrays, in accordance with an embodiment of the present disclosure. In FIGS. 2A and 2B, "G" refers to a green colour pixel, "R" refers to a red colour pixel, and "B" refers to a blue colour pixel. With reference to FIG. 2A, a smallest repeating 2×2 array 204a (depicted using a dashed box) of pixels is shown in the colour filter array (CFA) 202a. The CFA 202a is shown as a standard Bayer CFA, wherein the smallest repeating 2×2 array 204a of pixels has two green colour pixels, one red colour pixel, and one blue colour pixel. Herein, only 1 pixel of a same colour lies along a given direction (for example, such as a horizontal direction or a vertical direction) in the smallest repeating 2×2 array 204a.

With reference to FIG. 2B, a smallest repeating 4×4 array 204b (depicted using a dashed box) of pixels is shown in the CFA 202b. The CFA 202b is shown as a quad Bayer CFA, wherein the smallest repeating 4×4 array 204b of pixels has one 2×2 array of red colour pixels, two 2×2 arrays of green colour pixels, and one 2×2 array of blue colour pixels. Herein, 2 pixels of a same colour lie along the given direction (namely, the horizontal direction or the vertical direction) in the smallest repeating 4×4 array 204b.

Referring to FIG. 3, illustrated is how step sizes of sub-pixel shifts vary in a cycle of capturing sub-images, in accordance with an embodiment of the present disclosure. For sake of simplicity and better understanding, a sub-pixel shift of only a single pixel 302 (depicted using a dotted pattern) of an image sensor is shown. In said cycle, two sub-pixel shifts are performed when capturing the sub-images. From amongst the two sub-pixel shifts, a step size of a first sub-pixel shift (whose direction is depicted using a solid vertical arrow) is 0.5 pixel, i.e., the single pixel 302 is shown to be shifted vertically upwards by an amount defined by a half of a size of the single pixel 302. From amongst the two sub-pixel shifts, a step size of a second sub-pixel shift (whose direction is depicted using a solid horizontal arrow) is 1 complete pixel, i.e., the single pixel 302 is shown to be shifted horizontally rightwards by an amount defined by the (full) size of the single pixel 302.

Referring to FIGS. 4A, 4B, and 4C, illustrated is how sub-pixel shifting is performed when capturing three sub-images with an image sensor 402, in accordance with an embodiment of the present disclosure. For sake of simplicity and better understanding, sub-pixel shifting of only a portion (depicted using a dashed box) of the image sensor 402 is shown. The image sensor 402 comprises a standard Bayer colour filter array in which a smallest repeating 2×2 array of pixels has two green colour pixels (depicted using a letter "G"), one red colour pixel (depicted using a letter "R"), and one blue colour pixel (depicted using a letter "B"). As shown, in a single cycle, two sub-pixel shifts are performed by a wobulator for capturing the three sub-images. For capturing the three sub-images, light 406 incoming from a real-world scene of a real-world environment is detected by the portion of the image sensor 402. With reference to FIG. 4A, a first sub-image 404a from amongst the three sub-images is captured when the image sensor 402 is at its existing (i.e., original) position. With reference to FIG. 4B, a second sub-image 404b from amongst the three sub-images is captured when the image sensor 402 (or the light 406) is shifted by a step size of one complete pixel in a vertically downward direction according to one of the two sub-pixel shifts. With reference to FIG. 4C, a third sub-image 404c from amongst the three sub-images is captured when the image sensor 402 (or the light 406) is shifted by a step size of one complete pixel in a diagonally downward direction according to another of the two sub-pixel shifts. Subsequently, the first sub-image 404a, the second sub-image 404b, and the third sub-image 404c are processed to generate at least one image.

Figure 5A:
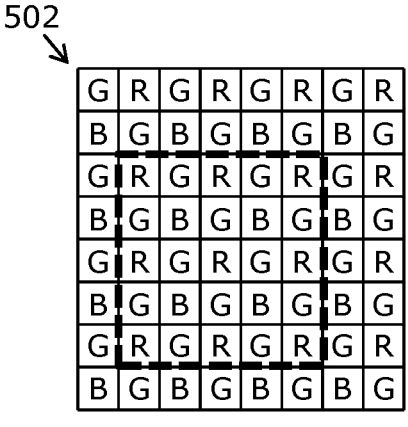
Figure 5C:
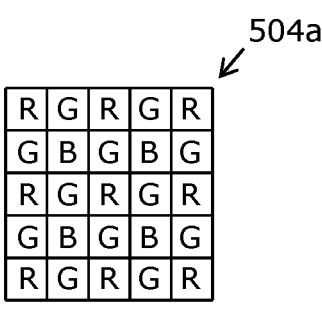
FIGS. 5C and 5D illustrate a first sub-image and a second sub-image, respectively, in accordance with an embodiment of the present disclosure.
Figure 5B:
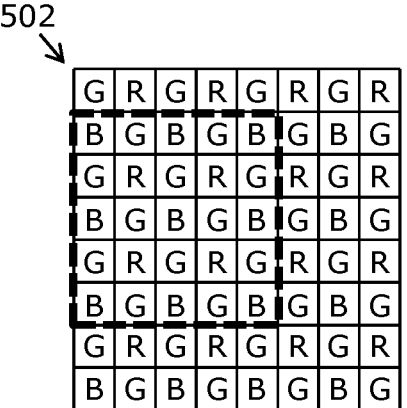
Figure 5D:
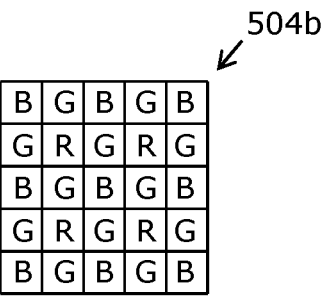

Referring to FIGS. 5A, 5B, 5C, and 5D, FIGS. 5A and 5B illustrate how sub-pixel shifting is performed when capturing two sub-images from an image sensor 502, while FIGS. 5C and 5D illustrate a first sub-image 504a and a second sub-image 504b, respectively, in accordance with an embodiment of the present disclosure. With reference to FIGS. 5A and 5B, for sake of simplicity and better understanding, sub-pixel shifting of only a portion (depicted using a dashed box) of the image sensor 502 is shown. The image sensor 502 comprises a standard Bayer colour filter array in which a smallest repeating 2×2 array of pixels has two green colour pixels (depicted using a letter "G"), one red colour pixel (depicted using a letter "R"), and one blue colour pixel (depicted using a letter "B"). As shown, in a single cycle, only one sub-pixel shift is performed by a wobulator for capturing the two sub-images from the image sensor 502. For capturing the two sub-images, light incoming from a real-world scene of a real-world environment is detected by the portion of the image sensor 502. With reference to FIGS. 5A and 5C, the first sub-image 504*a* (as depicted by FIG. 5C) from amongst the two sub-images is captured when the image sensor 502 is at its existing (i.e., original) position. With reference to FIGS. 5B and 5D, the second sub-image 504*b* (as depicted by FIG. 5D) from amongst the two sub-images is captured when the image sensor 502 (or the light) is shifted by a step size of one complete pixel in a diagonally upward direction according to the one sub-pixel shift. Subsequently, the first sub-image 504*a* and the second sub-image 504*b* are processed to generate at least one image.

Figures 6A, 6B, 6C:
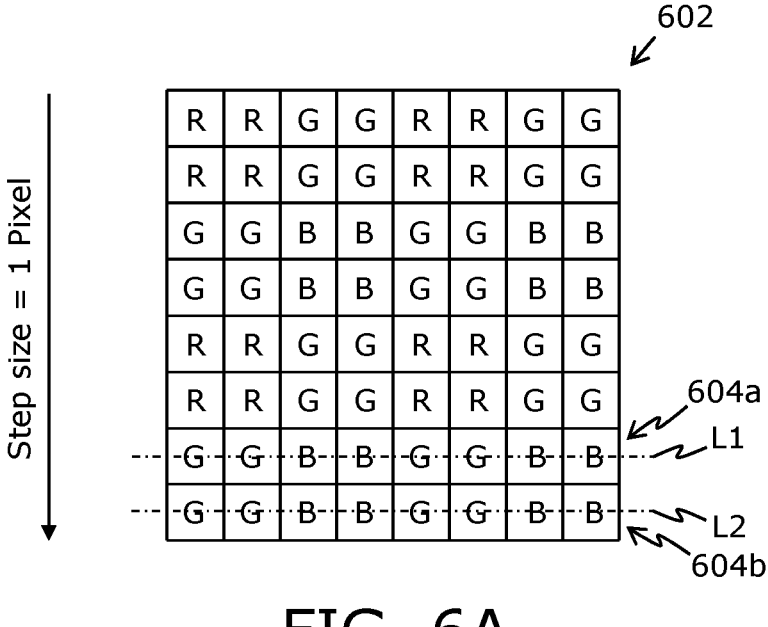
FIGS. 6A, 6B, and 6C illustrate an exemplary scenario of using a step size of one pixel for a sub-pixel shift, in accordance with an embodiment of the present disclosure.

Referring to FIGS. 6A, 6B, and 6C, illustrated is an exemplary scenario of using a step size of one pixel for a sub-pixel shift, in accordance with an embodiment of the present disclosure. With reference to FIG. 6A, an image sensor 602 is shown to comprise a quad Bayer colour filter array in which a smallest repeating 4×4 array of pixels has one 2×2 array of red colour pixels (depicted using a letter "R"), two 2×2 arrays of green colour pixels (depicted using a letter "G"), and one 2×2 array of blue colour pixels (depicted using a letter "B"). For sake of simplicity and better understanding, sub-pixel shifting is shown with respect to two reference lines L1 and L2 (depicted as two dash-dot lines) corresponding to two rows 604*a* and 604*b* of pixels of the image sensor 602, respectively. One sub-pixel shift is performed with the step size of one pixel in a vertically downward direction (depicted using a solid vertical arrow).

With reference to FIG. 6B, a top row indicates the pixels of the row 604*a* for which image data is captured when the image sensor 602 is at its existing (i.e., original) position with respect to the reference line L1. Further, a bottom row indicates pixels of a row that is above the row 604*a* for which image data is captured when the image sensor 602 is shifted by the step size of one (complete) pixel in the vertically downward direction according to the one sub-pixel shift. In this case, for each of two different colour pixels in the top row and the bottom row, only one colour pixel is missing to obtain complete Red-Green-Blue (RGB) colour information. Thus, only minimal demosaicking is required to be performed to obtain the missing colour.

With reference to FIG. 6C, a top row indicates the pixels of the row 604*b* for which image data is captured when the image sensor 602 is at its existing position with respect to the reference line L2. Further, a bottom row indicates the pixels of the row 604*a* that is above the row 604*b* for which image data is captured when the image sensor is shifted by the step size of one (complete) pixel in the vertically downward direction according to the one sub-pixel shift. In this case, for each of two same colour pixels in the top row and the bottom row, two different colour pixels are missing to obtain the complete RGB colour information.

Optionally, in such a case, values of the two same colour pixels can be averaged, and employed to achieve a denoising effect.

Figures 7A, 7B, 7C, 7D, 7E:
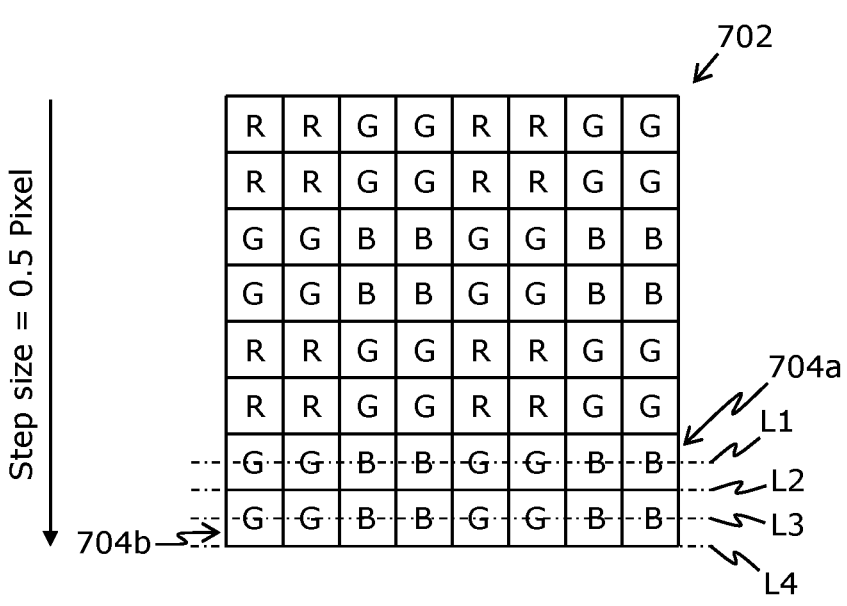
FIGS. 7A, 7B, 7C, 7D, and 7E illustrate an exemplary scenario of using a step size of a half of a pixel for a sub-pixel shift, in accordance with an embodiment of the present disclosure.

Referring to FIGS. 7A, 7B, 7C, 7D, and 7E, illustrated is an exemplary scenario of using a step size of a half of a pixel for a sub-pixel shift, in accordance with an embodiment of the present disclosure. With reference to FIG. 7A, an image sensor 702 is shown to comprise a quad Bayer colour filter array in which a smallest repeating 4×4 array of pixels has one 2×2 array of red colour pixels (depicted using a letter "R"), two 2×2 arrays of green colour pixels (depicted using a letter "G"), and one 2×2 array of blue colour pixels (depicted using a letter "B"). For sake of simplicity and better understanding, the sub-pixel shifting is shown with respect to four different reference lines L1, L2, L3, and L4 (depicted as four dash-dot lines), wherein the two reference lines L1 and L2 correspond to a row 704*a* of pixels of the image sensor 702, while the two reference lines L3 and L4 correspond a row 704*b* of pixels of the image sensor 702. One sub-pixel shift is performed with the step size of the half of the pixel (namely, 0.5 pixel) in a vertically downward direction (depicted using a solid vertical arrow).

With reference to FIG. 7B, a top row indicates the pixels of the row 704*a* for which image data is captured when the image sensor 702 is at its existing (i.e., original) position with respect to the reference line L1. Further, a bottom row indicates pixels of a row that is above the row 704*a* for which image data is captured when the image sensor 702 is shifted by the step size of 0.5 pixel in the vertically downward direction according to the one sub-pixel shift. In this case, for each of two different colour pixels in the top row and the bottom row, only one colour pixel is missing to obtain complete Red-Green-Blue (RGB) colour information. Thus, only minimal demosaicking is required to be performed to obtain the missing colour.

With reference to FIG. 7C, a top row indicates the pixels of the row 704*a* for which image data is captured when the image sensor 702 is at its existing position with respect to the reference line L2. A bottom row indicates the pixels of the (same) row 704*a* for which image data is captured when the image sensor is shifted by the step size of 0.5 pixel in the vertically downward direction according to the one sub-pixel shift. In this case, for each of two same colour pixels in the top row and the bottom row, two different colour pixels are missing to obtain the complete RGB colour information. Optionally, in such a case, values of the two same colour pixels can be averaged, and employed to achieve a denoising effect.

With reference to FIGS. 7D and 7E, a top row indicates the pixels of the row 704*b* for which image data is captured when the image sensor 702 is at its existing position with respect to the reference lines L3 and L4, respectively. Further, a bottom row indicates the pixels of the (same) row 704*b* for which image data is captured when the image sensor is shifted by the step size of 0.5 pixel in the vertically downward direction according to the one sub-pixel shift. In this case also, for each of two same colour pixels in the top row and the bottom row, two different colour pixels are missing to form the complete RGB colour information. Optionally, in such a case, values of the two same colour pixels can be averaged, and employed to achieve a denoising effect.

FIGS. 2A-2B, 3, 4A-4C, 5A-5B, 6A-6C, and 7A-7E are merely examples, which should not unduly limit the scope of the claims herein. The person skilled in the art will recognize many variations, alternatives, and modifications of embodiments of the present disclosure.

Figure 8:
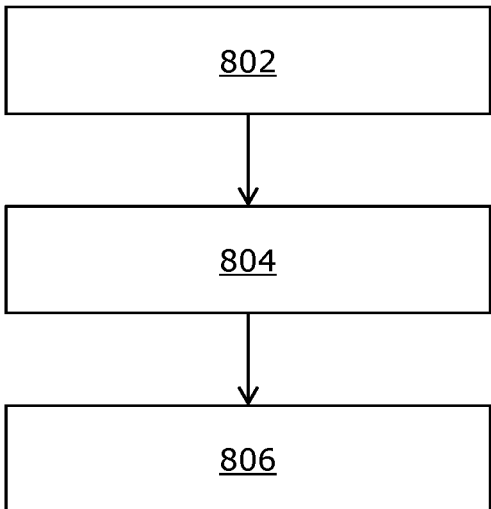
FIG. 8 illustrates steps of a method incorporating demosaicking and super-resolution using wobulation, in accordance with an embodiment of the present disclosure.

Referring to FIG. 8, illustrated are steps of a method incorporating demosaicking and super-resolution using wobulation, in accordance with an embodiment of the present disclosure. At step 802, in a cycle, two or three sub-images are obtained from an image sensor. At step 804, a wobulator is controlled to perform one or two sub-pixel shifts when capturing the two or three sub-images during said cycle, wherein step sizes of sub-pixel shifts vary within at least one of: a same cycle, different cycles, wherein at least one of the step sizes is X pixel, wherein X is a fraction that lies between 0 and 1, at least one other of the step sizes is Y pixels, wherein Y is an integer that lies in a range from 1 to Z, Z being equal to a number of pixels of a same colour that lie along a direction of a given sub-pixel shift in a smallest repeating M×N array in the image sensor. At step 806, the two or three sub-images of said cycle are processed to generate at least one image.

The aforementioned steps are only illustrative and other alternatives can also be provided where one or more steps are added, one or more steps are removed, or one or more steps are provided in a different sequence without departing from the scope of the claims herein.

What is claimed is:

1. An imaging system comprising:

an image sensor;

a wobulator that is to be employed to perform sub-pixel shifts when capturing images with the image sensor; and at least one processor configured to:

obtain, in a cycle, two or three sub-images from the image sensor;

control the wobulator to perform, during said cycle, one or two sub-pixel shifts, wherein step sizes of sub-pixel shifts vary within at least one of: a same cycle, different cycles, wherein at least one of the step sizes is X pixel, wherein X is a fraction that lies between 0 and 1, at least one other of the step sizes is Y pixels, wherein Y is an integer that lies in a range from 1 to Z, Z being equal to a number of pixels of a same colour that lie along a direction of a given sub-pixel shift in a smallest repeating M×N array in the image sensor; and process the two or three sub-images of said cycle, to generate at least one image;

wherein the at least one image comprises two or three images corresponding to the two or three sub-images, wherein the at least one processor is configured to:

obtain information indicative of a gaze direction of a user's eye;

identify a gaze position within a photosensitive surface of the image sensor, based on the gaze direction of the user's eye;

select a gaze region of the photosensitive surface based on the gaze position, wherein the gaze region of the photosensitive surface includes and surrounds the gaze position, while a peripheral region of the photosensitive surface surrounds the gaze region;

process parts of the two or three sub-images that have been read out from the gaze region of the photosensitive surface, to generate a single gaze image segment corresponding to the gaze region;

process respective parts of the two or three sub-images that have been read out from the peripheral region of the photosensitive surface, to generate respective ones of two or three peripheral image segments corresponding to the peripheral region; and combine each of the two or three peripheral image segments with the single gaze image segment, to generate a respective one of the two or three images.

2. The imaging system of claim 1, wherein, when processing, the at least one processor is configured to perform demosaicking on the two or three sub-images to generate the at least one image.

3. The imaging system of claim 1, wherein the two or three sub-images comprise subsampled image data, wherein, when processing, the at least one processor is configured to perform interpolation and demosaicking on the subsampled image data, to generate the at least one image.

4. The imaging system of claim 1, wherein the at least one processor is configured to process the two or three sub-images of said cycle to generate the at least one image, using at least one neural network, wherein an input of the at least one neural network comprises the two or three sub-images.

5. The imaging system of claim 4, wherein the input further comprises information indicative of: a direction in which the one or two sub-pixel shifts are performed, a step size of the one or two sub-pixel shifts.

6. An imaging system comprising:

an image sensor;

a wobulator that is to be employed to perform sub-pixel shifts when capturing images with the image sensor; and at least one processor configured to:

obtain, in a cycle, two or three sub-images from the image sensor;

control the wobulator to perform, during said cycle, one or two sub-pixel shifts, wherein step sizes of sub-pixel shifts vary within at least one of: a same cycle, different cycles, wherein at least one of the step sizes is X pixel, wherein X is a fraction that lies between 0 and 1, at least one other of the step sizes is Y pixels, wherein Y is an integer that lies in a range from 1 to Z, Z being equal to a number of pixels of a same colour that lie along a direction of a given sub-pixel shift in a smallest repeating M×N array in the image sensor; and process the two or three sub-images of said cycle, to generate at least one image;

wherein the at least one processor is configured to:

obtain information indicative of a gaze direction of a user's eye;

determine, based on the gaze direction of the user's eye obtained within a given time period, at least one of: a gaze velocity, a gaze acceleration, a predicted gaze direction, of the user's eye;

detect, based on the at least one of: the gaze velocity, the gaze acceleration, the predicted gaze prediction, whether the user's gaze has been fixated and a gaze region of a photosensitive surface of the image sensor where the user's gaze has been fixated; and perform operations of obtaining the two or three sub-images in the cycle, controlling the wobulator to perform the one or two sub-pixel shifts during the cycle, and processing the two or three sub-images to generate the at least one image, only when it is detected that the user's gaze has been fixated.

7. An imaging system comprising:

an image sensor;

a wobulator that is to be employed to perform sub-pixel shifts when capturing images with the image sensor; and at least one processor configured to:

obtain, in a cycle, two or three sub-images from the image sensor;

control the wobulator to perform, during said cycle, one or two sub-pixel shifts, wherein step sizes of sub-pixel shifts vary within at least one of: a same cycle, different cycles, wherein at least one of the step sizes is X pixel, wherein X is a fraction that lies between 0 and 1, at least one other of the step sizes is Y pixels, wherein Y is an integer that lies in a range from 1 to Z, Z being equal to a number of pixels of a same colour that lie along a direction of a given sub-pixel shift in a smallest repeating M×N array in the image sensor; and process the two or three sub-images of said cycle, to generate at least one image;

the imaging system further comprising pose-tracking means, wherein the at least one processor is configured to:

process pose-tracking data, obtained from the pose-tracking means, to determine a pose of the image sensor;

determine a rate at which the pose of the image sensor changes; and perform operations of obtaining the two or three sub-images in the cycle, controlling the wobulator to perform the one or two sub-pixel shifts during the cycle, and processing the two or three sub-images to generate the at least one image, only when the rate at which the pose of the image sensor changes does not exceed a predefined threshold.

8. An imaging system comprising:

an image sensor;

a wobulator that is to be employed to perform sub-pixel shifts when capturing images with the image sensor; and at least one processor configured to:

obtain, in a cycle, two or three sub-images from the image sensor;

control the wobulator to perform, during said cycle, one or two sub-pixel shifts, wherein step sizes of sub-pixel shifts vary within at least one of: a same cycle, different cycles, wherein at least one of the step sizes is X pixel, wherein X is a fraction that lies between 0 and 1, at least one other of the step sizes is Y pixels, wherein Y is an integer that lies in a range from 1 to Z, Z being equal to a number of pixels of a same colour that lie along a direction of a given sub-pixel shift in a smallest repeating M×N array in the image sensor; and process the two or three sub-images of said cycle, to generate at least one image;

wherein the at least one processor is configured to:

analyse a sequence of images captured using the image sensor, to detect a movement of objects represented in said sequence of images; and perform operations of obtaining the two or three sub-images in the cycle, controlling the wobulator to perform the one or two sub-pixel shifts during the cycle, and processing the two or three sub-images to generate the at least one image, only when a rate at which the objects move does not exceed a predefined threshold.

9. A method comprising:

obtaining, in a cycle, two or three sub-images from an image sensor;

controlling a wobulator to perform one or two sub-pixel shifts when capturing the two or three sub-images during said cycle, wherein step sizes of sub-pixel shifts vary within at least one of: a same cycle, different cycles, wherein at least one of the step sizes is X pixel, wherein X is a fraction that lies between 0 and 1, at least one other of the step sizes is Y pixels, wherein Y is an integer that lies in a range from 1 to Z, Z being equal to a number of pixels of a same colour that lie along a direction of a given sub-pixel shift in a smallest repeating M×N array in the image sensor; and processing the two or three sub-images of said cycle, to generate at least one image;

wherein the at least one image comprises two or three images corresponding to the two or three sub-images, and wherein the method further comprises:

obtaining information indicative of a gaze direction of a user's eye;

identifying a gaze position within a photosensitive surface of the image sensor, based on the gaze direction of the user's eye;

selecting a gaze region of the photosensitive surface based on the gaze position, wherein the gaze region of the photosensitive surface includes and surrounds the gaze position, while a peripheral region of the photosensitive surface surrounds the gaze region;

processing parts of the two or three sub-images that have been read out from the gaze region of the photosensitive surface, for generating a single gaze image segment corresponding to the gaze region;

processing respective parts of the two or three sub-images that have been read out from the peripheral region of the photosensitive surface, for generating respective ones of two or three peripheral image segments corresponding to the peripheral region; and combining each of the two or three peripheral image segments with the single gaze image segment, for generating a respective one of the two or three images.

10. The method of claim 9, wherein the step of processing comprises performing demosaicking on the two or three sub-images for generating the at least one image.

11. The method of claim 9, wherein the two or three sub-images comprise subsampled image data, and wherein the step of processing comprises performing interpolation and demosaicking on the subsampled image data, for generating the at least one image.

12. The method of claim 9, wherein the step of processing the two or three sub-images of said cycle to generate the at least one image is performed using at least one neural network, wherein an input of the at least one neural network comprises the two or three sub-images.

13. The method of claim 12, wherein the input further comprises information indicative of: a direction in which the one or two sub-pixel shifts are performed, a step size of the one or two sub-pixel shifts.

14. A method comprising:

obtaining, in a cycle, two or three sub-images from an image sensor;

controlling a wobulator to perform one or two sub-pixel shifts when capturing the two or three sub-images during said cycle, wherein step sizes of sub-pixel shifts vary within at least one of: a same cycle, different cycles, wherein at least one of the step sizes is X pixel, wherein X is a fraction that lies between 0 and 1, at least one other of the step sizes is Y pixels, wherein Y is an integer that lies in a range from 1 to Z, Z being equal to a number of pixels of a same colour that lie along a direction of a given sub-pixel shift in a smallest repeating M×N array in the image sensor;

processing the two or three sub-images of said cycle, to generate at least one image;

obtaining information indicative of a gaze direction of a user's eye;

determining, based on the gaze direction of the user's eye obtained within a given time period, at least one of: a gaze velocity, a gaze acceleration, a predicted gaze direction, of the user's eye;

detecting, based on the at least one of: the gaze velocity, the gaze acceleration, the predicted gaze prediction, whether the user's gaze has been fixated and a gaze region of a photosensitive surface of the image sensor where the user's gaze has been fixated; and performing operations of obtaining the two or three sub-images in the cycle, controlling the wobulator to perform the one or two sub-pixel shifts during the cycle, and processing the two or three sub-images to generate the at least one image, only when it is detected that the user's gaze has been fixated.

15. A method comprising:

obtaining, in a cycle, two or three sub-images from an image sensor;

controlling a wobulator to perform one or two sub-pixel shifts when capturing the two or three sub-images during said cycle, wherein step sizes of sub-pixel shifts vary within at least one of: a same cycle, different cycles, wherein at least one of the step sizes is X pixel, wherein X is a fraction that lies between 0 and 1, at least one other of the step sizes is Y pixels, wherein Y is an integer that lies in a range from 1 to Z, Z being equal to a number of pixels of a same colour that lie along a direction of a given sub-pixel shift in a smallest repeating M×N array in the image sensor;

processing the two or three sub-images of said cycle, to generate at least one image;

processing pose-tracking data, obtained from pose-tracking means, to determine a pose of the image sensor;

determining a rate at which the pose of the image sensor changes; and performing operations of obtaining the two or three sub-images in the cycle, controlling the wobulator to perform the one or two sub-pixel shifts during the cycle, and processing the two or three sub-images to generate the at least one image, only when the rate at which the pose of the image sensor changes does not exceed a predefined threshold.

16. A method comprising:

obtaining, in a cycle, two or three sub-images from an image sensor;

controlling a wobulator to perform one or two sub-pixel shifts when capturing the two or three sub-images during said cycle, wherein step sizes of sub-pixel shifts vary within at least one of: a same cycle, different cycles, wherein at least one of the step sizes is X pixel, wherein X is a fraction that lies between 0 and 1, at least one other of the step sizes is Y pixels, wherein Y is an integer that lies in a range from 1 to Z, Z being equal to a number of pixels of a same colour that lie along a direction of a given sub-pixel shift in a smallest repeating M×N array in the image sensor;

processing the two or three sub-images of said cycle, to generate at least one image;

analysing a sequence of images captured using the image sensor, to detect a movement of objects represented in said sequence of images; and performing operations of obtaining the two or three sub-images in the cycle, controlling the wobulator to perform the one or two sub-pixel shifts during the cycle, and processing the two or three sub-images to generate the at least one image, only when a rate at which the objects move does not exceed a predefined threshold.

17. An imaging system comprising:

an image sensor;

a wobulator that is to be employed to perform sub-pixel shifts when capturing images with the image sensor; and at least one processor configured to:

obtain, in a cycle, two or three sub-images from the image sensor;

control the wobulator to perform, during said cycle, one or two sub-pixel shifts, wherein step sizes of sub-pixel shifts vary within at least one of: a same cycle, different cycles, wherein at least one of the step sizes is X pixel, wherein X is a fraction that lies between 0 and 1, at least one other of the step sizes is Y pixels, wherein Y is an integer that lies in a range from 1 to Z, Z being equal to a number of pixels of a same colour that lie along a direction of a given sub-pixel shift in a smallest repeating M×N array in the image sensor; and process the two or three sub-images of said cycle, to generate at least one image;

wherein the at least one processor is configured to:

obtain information indicative of a gaze direction of a user's eye;

determine, based on the gaze direction of the user's eye obtained within a given time period, at least one of: a gaze velocity, a gaze acceleration, a predicted gaze direction, of the user's eye;

detect, based on the at least one of: the gaze velocity, the gaze acceleration, the predicted gaze prediction, whether the user's gaze has been fixated and a gaze region of a photosensitive surface of the image sensor where the user's gaze has been fixated; and perform operations of obtaining the two or three sub-images in the cycle, controlling the wobulator to perform the one or two sub-pixel shifts during the cycle, and processing the two or three sub-images to generate the at least one image, only when it is detected that the user's gaze has been fixated;

wherein the step of processing the two or three sub-images is performed for the gaze region only.

18. A method comprising:

obtaining, in a cycle, two or three sub-images from an image sensor;

controlling a wobulator to perform one or two sub-pixel shifts when capturing the two or three sub-images during said cycle, wherein step sizes of sub-pixel shifts vary within at least one of: a same cycle, different cycles, wherein at least one of the step sizes is X pixel, wherein X is a fraction that lies between 0 and 1, at least one other of the step sizes is Y pixels, wherein Y is an integer that lies in a range from 1 to Z, Z being equal to a number of pixels of a same colour that lie along a direction of a given sub-pixel shift in a smallest repeating M×N array in the image sensor; and processing the two or three sub-images of said cycle, to generate at least one image;

obtaining information indicative of a gaze direction of a user's eye;

determining, based on the gaze direction of the user's eye obtained within a given time period, at least one of: a gaze velocity, a gaze acceleration, a predicted gaze direction, of the user's eye;

detecting, based on the at least one of: the gaze velocity, the gaze acceleration, the predicted gaze prediction, whether the user's gaze has been fixated and a gaze region of a photosensitive surface of the image sensor where the user's gaze has been fixated;

performing operations of obtaining the two or three sub-images in the cycle, controlling the wobulator to perform the one or two sub-pixel shifts during the cycle, and processing the two or three sub-images to generate the at least one image, only when it is detected that the user's gaze has been fixated;

wherein the step of processing the two or three sub-images is performed for the gaze region only.

* * * * *